B. L. STOWE.
PNEUMATIC TIRE.
APPLICATION FILED APR. 5, 1918.
1,321,403.
Patented Nov. 11, 1919.
2 SHEETS—SHEET 1.
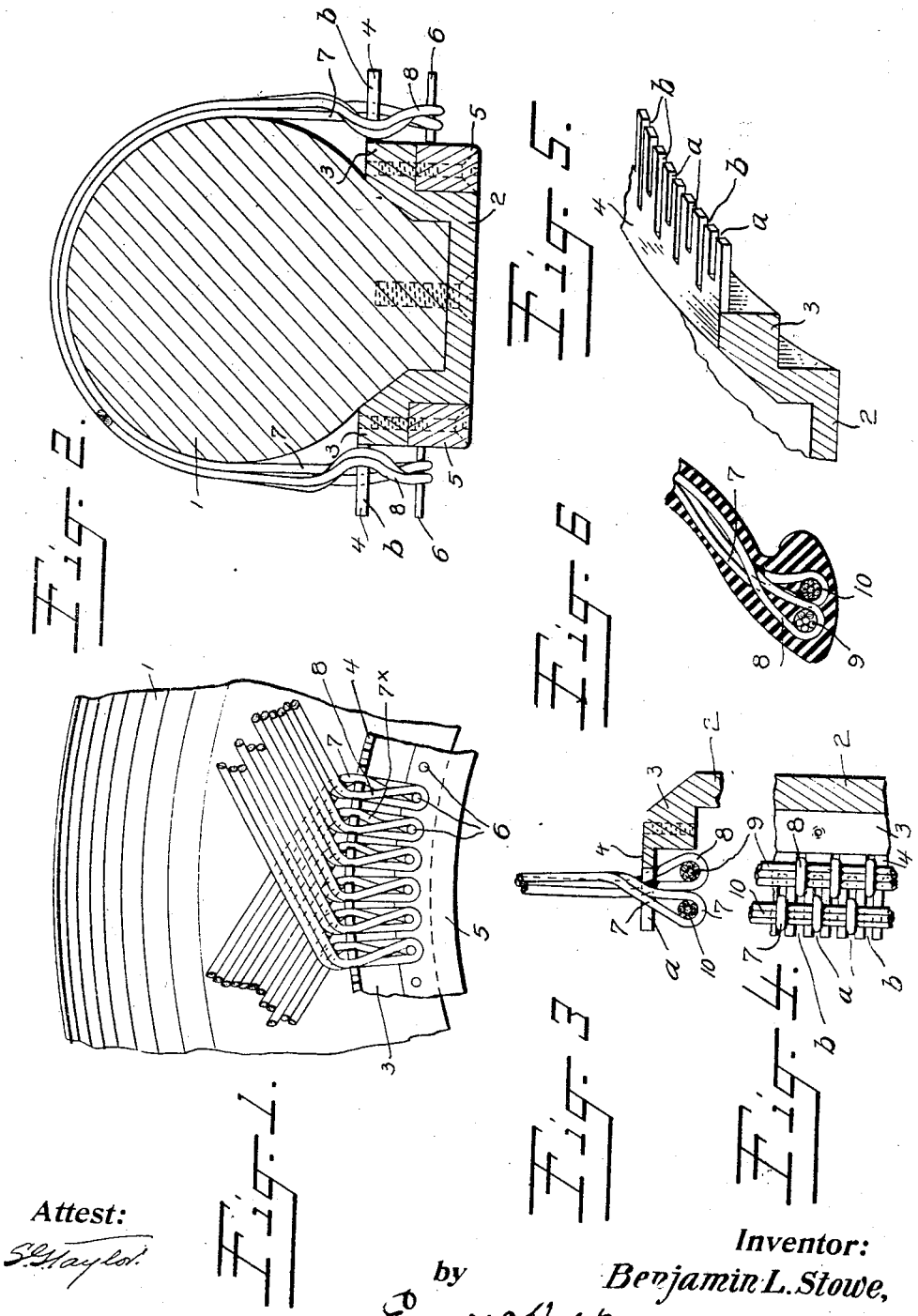
Attest:
S. G. Taylor.
Inventor:
Benjamin L. Stowe,
by Ernest E. Hopkinson his Atty.

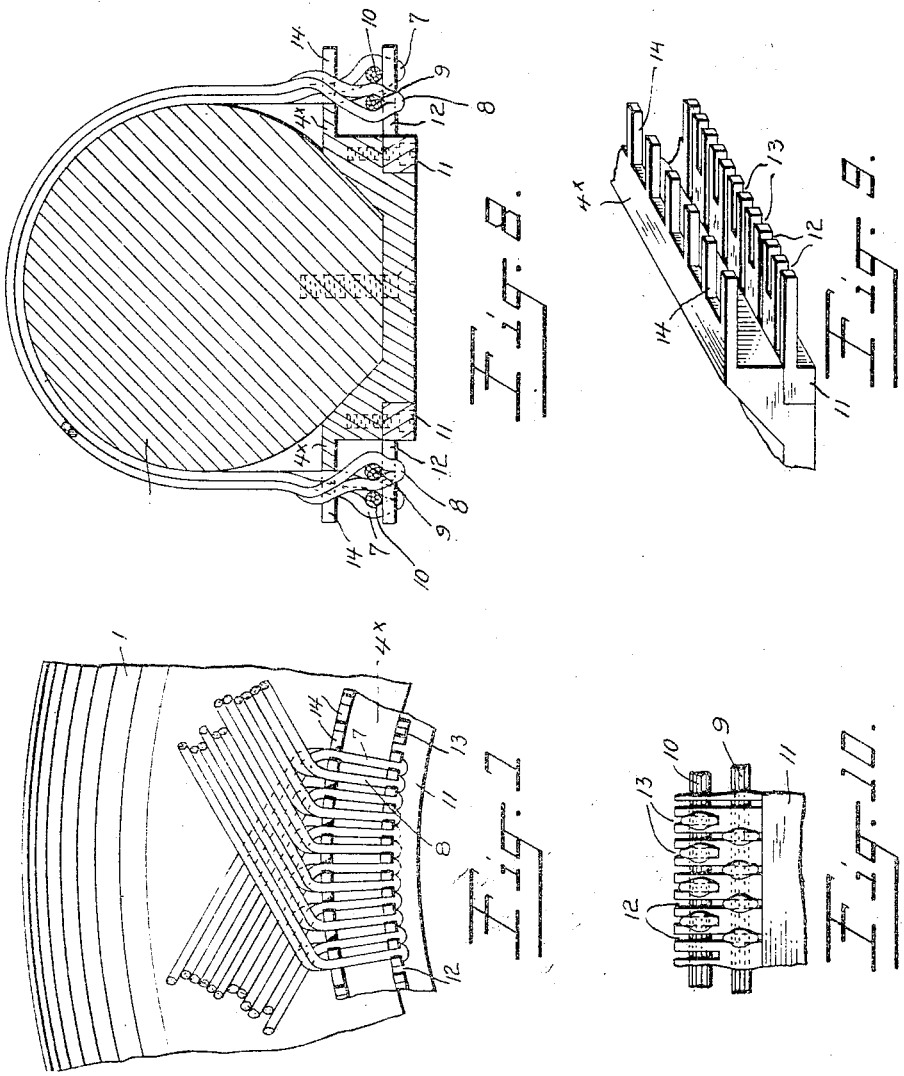

UNITED STATES PATENT OFFICE.

BENJAMIN L. STOWE, OF JERSEY CITY, NEW JERSEY, ASSIGNOR TO MORGAN & WRIGHT, A CORPORATION OF MICHIGAN.

PNEUMATIC TIRE.

1,321,403.   Specification of Letters Patent.   Patented Nov. 11, 1919.

Application filed April 5, 1918. Serial No. 226,849.

*To all whom it may concern:*

Be it known that I, BENJAMIN L. STOWE, a citizen of the United States, residing in Jersey City, county of Hudson, and State of New Jersey, have invented certain new and useful Improvements in Pneumatic Tires, of which the following is a full, clear, and exact description.

My invention relates to a cord tire composed of a plurality of layers or plies. The principal object of the invention is to so arrange the cords of one ply with respect to cords of an adjacent ply as, independent of any applied fastening, to adequately resist the creeping of one ply with respect to the other.

In the manufacture of the tire, each ply may be built up from a single length of cord doubled backward and forward upon itself so that it provides a series of lengths of cord extending side by side. During the building up of the tire, the cord may be looped around two series of pins carried by a suitable form, or the loops may be wedged in suitable recesses formed in said form, so that the lengths of cord, or cords as they are called, pass obliquely across the form between the pins or recesses, the direction of the cords of contiguous layers being reversed. The cords of one layer or ply near the bights of their loops at the margin of the tire, are bent or turned to cross the cords of an adjacent layer or ply in such manner that the circumferential movement of either ply will be strongly resisted by the other. For example, the cords of an outer ply may be turned inwardly and a reverse turn be given to the cords of an inner ply, the loops of the cords composing the outer layer being retained in position by a bead wire which is parallel with a second bead wire serving to retain the cords of the inner ply in position.

The invention may be understood by reference to the accompanying drawings in which:

Figure 1 is a fragmentary side elevation of an apparatus suitable for constructing my improved tire, showing lengths of cord in position thereon, and Fig. 2 is a cross sectional view of the said apparatus.

Fig. 3 is a fragmentary view showing the bead wires in position, and

Fig. 4 is a bottom plan view of the same.

Fig. 5 is a sectional perspective view of a spacing ring.

Fig. 6 is a fragmentary cross sectional view showing the position of the cords in a section of the completed tire.

Fig. 7 is a modification of the apparatus for constructing the improved tire, and Fig. 8 is a cross sectional view of the same.

Fig. 9 is a sectional perspective view of certain members of the modified form of apparatus, and Fig. 10 is a fragmental bottom plan view showing a number of the cords and sections of the bead wires or rings in position with respect to the said modified apparatus.

An apparatus adapted for use in the winding of the cord layers of the tire, in its preferred form, comprises a ring core 1 on the inner surface of which is secured a ring 2 provided with laterally extending flanges 3, each flange being formed with an overhanging plate 4 in which is formed a series of shallow spacing recesses $a$ arranged alternately with respect to a series of deep spacing recesses $b$. The ring 2 is formed in sections so that it may be readily removed from the ring core when desired. To each flange 3 is secured a ring 5, the latter being provided with a series of laterally projecting pins 6, one pin being provided for two of the spacing recesses in the overhanging plate 4.

One method of constructing the tire will now be described. A loop 7 of the cord is passed diagonally across the surface of the core 1 and is pressed into one of the shallow spacing recesses $a$, the bight of the loop being then carried to and passed around a pin 6. This is repeated on the opposite side of the core. The next loop 7× is then brought across the core and pressed into the next shallow spacing recess and the bight of its loop placed around the pin adjacent the one holding the first named loop. This operation of passing loops across the core, pressing the same into the successive shallow spacing recesses, and placing the loops around the pins 6, is performed alternately first on one side of the core and then on the other side of the core until a complete layer of diagonal cords is formed on the core.

The section having its cords at approximately right angles to those of the first layer, is then begun, the first loop 8 of the cord being brought across the core and pressed into a deep spacing recess *b*, its loops then being placed around one of the pins 6 as illustrated in Figs. 1 and 2 of the drawings. This is repeated on the opposite side of the core, and the operation of passing loops around the core, pressing the same into the deep recesses *b* and placing the loops around the pins 6 is repeated until the second layer is completely formed. More than two layers may be laid if desired, but for the present description the winding will be considered complete when all of the cords of the first two layers are laid.

When the winding operation above described is completed, each of the rings 5 is removed from the ring 2, and thus the pins 6 will be withdrawn from the loops. Owing to the position in which the loops of each layer are held by an appropriate series of spacing recesses in plate 4, the proper position of the loops below the plate for the insertion of the bead rings may readily be arranged. That is to say the loops of the outermost layer will be turned inwardly, and the loops of the innermost layer will be turned outwardly, the loops assuming somewhat the position illustrated in Fig. 3. While the loops hang loosely below plate 4 in the manner above described, a bead ring 9 is placed within the loops 8 of the outermost layer, and a bead ring 10 is placed within the loops 7 of the innermost layer. After insertion of both bead rings, the sectional ring 2 is removed from the core, and the core may be removed from the carcass formed by the two cord layers, or the tire may be completed and vulcanized on the core before its removal if desired.

After the tire is completely formed and vulcanized in the usual manner, a cross section of a bead, assuming it to be of the clencher type, will appear as illustrated in Fig. 6. By reference to the said figure, it will be seen that the movement of either cord layer circumferentially of the tire is prevented by the lock provided at the point at which the cord loops of one layer cross the other at a substantial distance from the bead rings.

Various modifications of the apparatus may be designed. One modification I have illustrated in Figs. 7 to 10 of the drawing. In the said modification I dispense with the pins 6 and substitute therefor rings 11, each being formed with a series of deep spacing recesses 12 arranged alternately with a series of shallow spacing recesses 13, while the plate 4$^x$ corresponding to plate 4, Fig. 2, is provided with wide spacing recesses 14, each recess being adapted to receive and hold side by side a cord loop from each layer. In this modification, the bead rings 9 and 10 may be inserted within the cord loops while the said loops are held in position in the spacing recesses of the rings.

Having thus described my invention, what I claim and desire to protect by Letters Patent is:

1. In a tire, the combination of an inner bead ring and an outer bead ring for a side of the tire, an inner layer of cord having loops around the outer bead ring, and an outer layer of cord having loops around the inner bead ring.

2. In a tire, the combination of an inner bead ring and an outer bead ring for each side of the tire, an inner layer of cord having loops around each outer bead ring, and an outer layer of cord having loops around each inner bead ring.

3. In a tire the combination of two bead rings for each side of the tire and two layers of cord, each layer of cord having loops passing around a bead ring and extending transversely of the loops of the other layer at a point between the said bead rings and the periphery of the tire.

4. In a tire, the combination of inner and outer layers of cord, each layer having loops at the side margins of the tire, the loops of the outer layer being bent toward the inner wall of the tire, and crossing the loops of the inner layer, and anchoring means for the said loops.

Signed at Jersey City, New Jersey, this 25 day of March, 1918.

BENJAMIN L. STOWE.